United States Patent [19]

Bechara et al.

[11] 4,026,840
[45] May 31, 1977

[54] HYDROXYALKYL TERTIARY AMINE CATALYSTS FOR ISOCYANATE REACTIONS

[75] Inventors: Ibrahim S. Bechara, Boothwyn; Felix P. Carroll, Chester; Rocco L. Mascioli, Media, all of Pa.

[73] Assignee: Air Products and Chemicals, Inc., Allentown, Pa.

[22] Filed: June 9, 1975

[21] Appl. No.: 585,327

[52] U.S. Cl. ............... 260/2.5 AC; 260/2.5 AW; 260/2.5 BF; 260/75 NC; 260/77.5 AC; 260/77.5 NC

[51] Int. Cl.² ........................ C08G 18/16

[58] Field of Search ........... 260/2.5 AC, 77.5 AC, 260/75 NC, 2.5 AW, 248 NS, 2.5 BF, 77.5 NC

[56] References Cited

UNITED STATES PATENTS

| | | |
|---|---|---|
| 2,995,530 | 8/1961 | Frisch et al. ............ 260/2.5 AC |
| 3,050,475 | 8/1962 | Muller et al. ............ 260/2.5 AC |
| 3,520,835 | 7/1970 | Chandley et al. ......... 260/77.5 AC |
| 3,824,239 | 7/1974 | Narayan et al. .......... 260/2.5 AC |
| 3,824,240 | 7/1974 | Narayan et al. .......... 260/2.5 AC |
| 3,928,256 | 12/1975 | Cenker et al. ........... 260/2.5 AC |

*Primary Examiner*—Eugene C. Rzucidlo
*Attorney, Agent, or Firm*—Richard A. Dannells; Barry Moyerman

[57] ABSTRACT

Isocyanate reactions, such as their condensation with polyols to form polyurethanes and their polymerization to polyisocyanurates, are promoted by certain hydroxyalkyl tertiary amine catalysts corresponding to the formula

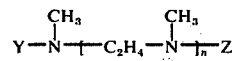

wherein
$Y = CH_3$ or $Z$
$Z = -CH_2.CH_2OH$
$n = 1$ or $2$

11 Claims, No Drawings

HYDROXYALKYL TERTIARY AMINE CATALYSTS FOR ISOCYANATE REACTIONS

BACKGROUND OF THE INVENTION

1. Field of the Invention

The present invention relates to the general field of basic catalysis of organic reactions and is particularly concerned with catalysts for promotion of reactions involving organic isocyanates as in the production of polyisocyanurates and polyurethanes.

2. Prior Art

It is well known in the art that tertiary amines are good catalysts for production of polyurethanes. Also certain hydroxyalkyl tertiary amines have been advocated for polyurethane production. In particular, dimethyl ethanolamine has been employed for such purpose but it suffers from the drawbacks of relatively high volatility and its poor gel and curing properties. To overcome these deficiencies dimethyl ethanolamine is more generally employed as a cocatalyst with other known superior tertiary amine polyurethane catalysts such as diazabicyclo-octane.

Tertiary amines, however, are not generally effective as polyisocyanurate catalysts. The use of hydroxyethyl tertiary amines as polyisocyanurate catalysts have been mentioned but only in conjunction with alkylene oxides or as adducts of polyisocyanates, as in U.S. Pat. No. 3,786,030. Hydroxyethyl tertiary amines as such, as exemplified by dimethyl ethanol amine, were not known to be effective as polyisocyanurate catalysts.

In recent patents (U.S. Pat. Nos. 3,824,239 and 3,824,240) it is disclosed that certain hydroxyalkylamines are effective as trimerization catalysts for isocyanates, but the compounds disclosed in these patents are limited generally to those in which the hydroxyalkylamine function is associated with an aromatic triazine nuclear structure, which structures in themselves demonstrate good trimerization activity.

SUMMARY OF THE INVENTION

It has now been discovered that certain hydroxyalkyl tertiary amines having at least one primary hydroxyethyl group and at least two tertiary nitrogen atoms in the molecule, are not only excellent gelling and curing catalysts in polyurethanes but also exhibit unexpectedly effective catalytic activity in trimerization of organic isocyanates and in carbo-diimide formation from organic isocyanates. It was also unexpectedly found that the hydroxyl group of these tertiary amines plays an important role in the overall activity of the catalysts of the present invention and that particularly those compounds having a primary hydroxyl group possess far superior activity over those of similar structure having a secondary or tertiary hydroxyl group.

DETAILED DESCRIPTION OF THE INVENTION

More particularly, it has now been found, in accordance with the present invention, that compounds of the general formula

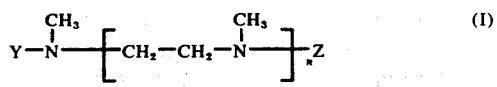

exhibit unexpectedly high catalytic activity in isocyanate reactions such as in the production of polyurethanes and polyisocyanurates. In the above formula (I) preferred compounds are those in which

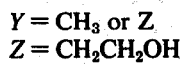

$Y = CH_3$ or $Z$
$Z = CH_2CH_2OH$
$n = 1$ or $2$

Compounds of the described formula may be prepared by methods generally known in the art, such as by reaction of an alkanolamine with formaldehyde and formic acid following the known Leuckhardt synthesis procedure (Surrey, A.R., "Name Reactions in Organic Chemistry", 2d. ed., (1961) pp 157–159).

Among the preferred catalysts of the present invention which can be prepared by the classical Leuckhardt synthesis are:

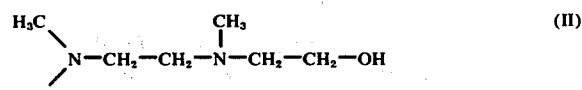

trimethylhydroxyethylethylenediamine or N,N,N' trimethylaminoethylethanolamine

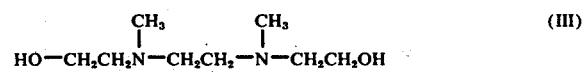

N,N' bis hydroxyethyldimethylethylenediamine

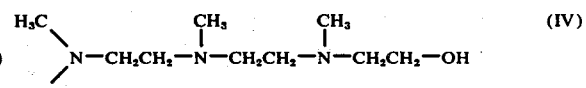

N-hydroxyethyl N,N',N" tetramethyldiethylenetriamine

The isomeric forms of III and IV and similarly structured compounds in accordance with Formula I are effective also.

In the preparation of urethane resins any of the compounds of the present invention can be used as the sole catalyst or as cocatalyst with other tertiary amines such as with triethylene diamines, or in conjunction with the known organometallic polyurethane catalysts such as those comprising salts or complexes with tin, lead or antimony. Any of the known polyols heretofore suggested for reaction with polyisocyanates for polyurethane production may be used with the catalysts of the invention, including polyether and polyester glycols, without significant departure except for the catalyst, from known formulations and procedures. Thus, the polyols can be based on glycol, glycerine, or higher polyols and may contain other functional groups as those polyols based on sucrose or the so called amine polyols. The hydroxy function of the polyol may be primary or secondary or a mixture of both of these. In general there can be employed any polyol having at least two active hydrogen atoms responding to the Zerewitinoff test.

In the practice of the invention in trimerization reactions for production of polyisocyanurates, as well as in polyurethane formation, the usual blowing agents, surfactants, fire retardants, fillers and other customary additives may be used in the formulation. The hydroxyalkyl tertiary amine catalysts of the invention can be used alone in that form or in their carboxylic acid salt form; also these may be used in conjunction with other cocatalysts such as potassium carboxylates. The compounds of the invention can be reacted with mono- or poly-functional organic isocyanates to form corresponding adducts and these adducts employed as catalysts. In the preparation of isocyanurates, it is also known to include in addition to the isocyanates to be polymerized, other resins such as epoxies and epoxynovolac resins, or simple alkylene oxides. Such formulations can also be employed with the catalysts of the present invention.

The isocyanates that can be employed in preparation of resins according to the invention include carbocyclic isocyanates such as tolylene diisocyanate (TDI) and the technical grades of isomeric tolylene diisocyanates commercially available, as well as diphenyl methane diisocyanate; polymeric isocyanates, isothiocyanates, aliphatic and cycloaliphatic isocyanates.

PRODUCTION OF THE CATALYSTS

EXAMPLE 1

Compounds corresponding to Formula I and illustrative of Formulae II, III and IV, employed as catalyst in certain of the formulations in Examples below, were produced in the following manner:

A. N,N,N'trimethylaminoethylethanolamine (Formula II)

In a resin kettle (or flask) was charged 1 mole of aminoethylethanolamine (AEEA) and to it was added slowly 5 moles of formic acid and 3.5 moles of 40% aqueous formaldehyde. The mixture was then heated on a steam bath until the evolution of carbon dioxide ceased. The mixture was then cooled in a water bath and sodium hydroxide added with stirring until phase separation occurred. The top layer (the amine layer) was isolated and distilled. The fraction distilled at 195°–200° C was collected as the product and weighed 90 grams. The product had the following properties:

| Boiling Point | 90° C at 10 mm Hg |
|---|---|
| Refractive index at 23° C | 1.4577 |

N.M.R. analysis: for the structure

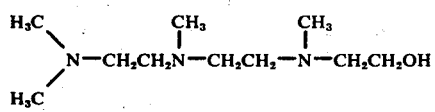

| Functional Groups | Chemical Shift in ppm. | Integrated Area Under the Peak | No. of Protons |
|---|---|---|---|
| a | 4.82(singlet) | 14 | 1 (shifted on D₂O addition) |
| b | 3.52(triplet) | 28 | 2 |
| c | 2.3–2.7(couplex) | 91 | 6 |
| d & e | 2.17–2.23 (singlets) | 128 | 9 |

Literature data on the compound
Refractive index at 20° C = 1.4578
Boiling Points    207° C at atmospheric pressure
                  84° C at 10 mm, Hg B. Preparation of N,N'dimethyl N,N'bis hydroxyethylethylenediamine

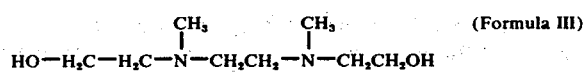
(Formula III)

Procedure:

The procedure in A. above was followed. 74g of N,N'bis hydroxyethylethylenediamine were reacted with 70g of 88% formic acid and 100cc of 40% aqueous formaldehyde. After work up of the reaction mixture the fraction distilling at 145° C and 4 mm Hg was collected as the product amounting to about 60 grams.

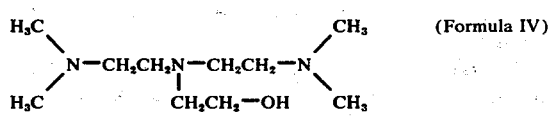

| Functional Group | Chemical Shift in ppm (multiplicity) | Integrated Area Under the Peak | No. of Protons |
|---|---|---|---|
| b | 3.5(triplet) | 46 | 4 |
| c + e | 2.4–2.7(triplets + singlet) | 97* | 8* |
| d | 2.2–2.3(singletf) | 70 | 6 |

*combined

C. Preparation of tetramethylhydroxyethyldiethylenetriamine $$H_3C\!\!\diagdown\!\!N\!\!-\!\!CH_2CH_2N\!\!-\!\!CH_2CH_2\!\!-\!\!N\!\!-\!\!CH_2CH_2OH$$
$$H_3C\!\!\diagup\quad\quad\quad|\quad\quad\quad\quad|$$
$$\quad\quad\quad\quad\quad CH_3\quad\quad\quad CH_3$$

$$+$$

$$H_3C\!\!\diagdown\quad\quad\quad\quad\quad\quad\quad\quad\diagup CH_3 \quad\text{(Formula IV)}$$
$$\quad\quad N\!\!-\!\!CH_2CH_2N\!\!-\!\!CH_2CH_2\!\!-\!\!N$$
$$H_3C\!\!\diagup\quad\quad\quad|\quad\quad\quad\quad\quad\diagdown CH_3$$
$$\quad\quad\quad\quad\quad CH_2CH_2\!\!-\!\!OH$$

The procedure in A. above was followed. The quantities reacted were
 70g of crude hydroxyethyl diethylene triamine
 250g of 88% formic acid
 320g of 40% aqueous formaldehyde
 After work-up the fraction distilling at 95°–120° C and 3mm Hg was collected, 77.4 grams, as the product mixture.
 The refractive index at 22° C = 1.4644

The following examples are illustrative of various formulations that can be employed in practice of the invention, without being limited thereto:

EXAMPLE 2

Trimerization of phenyl isocyanate

A. Into a flask equipped with a thermowell there was charged 11.9 parts by weight of phenyl isocyanate. To this was added 0.12 parts (1% by weight of isocyanate) of trimethylaminoethylethanolamine (TMAEEA). A thermocouple was put in place and the mixture agitated for a few seconds then allowed to stand. After about 80 minutes a sudden reaction took place accompanied by an exotherm that drove the temperature from 100° to 250° F (about 37.8° to 121° C) and the whole mixture turned into a solid mass. After washing with methanol, a melting point determination was made and found to be 284°–285° C (the literature reports 282° C as the melting point of phenylisocyanurate). Infrared spectrum showed for this product the same characteristic bands as those reported in the literature for phenyl isocyanurate.

B. The run above was repeated increasing the amount of TMAEEA catalyst to 2% by weight of the isocyanate. This time the reaction was spontaneous with hardly any induction period. The product was likewise identified as phenyl isocyanurate.

C. A number of similar runs were made except that other amines and hydroxylamines respectively were substituted for the TMAEEA catalyst previously employed. The results are summarized in Table I below:

The data as to cream time (C.T.), rise time (R.T.) and hard gel time (H.G.T.) in the runs made with the different catalysts are reported in Table 3 below:

TABLE 3

| Catalyst | Conc. PHP | C.T. Secs. | R.T. Secs. | H.G.T. Secs. | Remarks |
|---|---|---|---|---|---|
| Niax A-1 | 0.08 | ⎫ | | | Foam showed |
| (12) NEM | 0.80 | ⎬ 13 | 183 | 153 | shrinkage |
| (13) DABCO | 0.08 | ⎭ | | | |
| TMAEEA | 0.06 | 17 | 145 | 125 | Mod. Shrinkage |
| | 0.06 | 17 | 138 | 127 | " |
| | 0.8 | 13 | 97 | 83 | Good foam |
| | 0.8 | 14 | 98 | 85 | " |
| | 1.0 | 11 | 84 | 80 | Good foam |
| | 1.0 | 10 | 87 | 78 | No shrinkage |

(9) Polyol from glycerine and propylene oxide of 5000 MW, having 70–75% primary OH.
(10) 20% gragt of acrylonitrile-styrene onto a 5000 MW polyol having 70% primary OH.
(11) Silicone stabilizer; U.S. Pat. 3,741,917.
(12) N-ethyl morpholine
(13) Triethylene diamine (Air Products & Chemicals, Inc.)

EXAMPLE 5

The following formulation was employed in making a flexible polyester polyurethane foam of the water-blown type by the one-shot method

| | pbw |
|---|---|
| Fomrex 50 | 100.0 |
| Water | 3.6 |
| Silicone L-532 | 1.0 |
| Catalyst | Various |

The results obtained are reported in Table 4 below in comparison to a typical catalyst employed in such formulations.

TABLE 4

| Catalyst | Conc. (PHP) | CT (sec) | RT (sec) | Hard Gel Time (sec) | Remarks |
|---|---|---|---|---|---|
| NEM | 1.6 | ⎫ | | | |
| (14) DM-16D | 0.3 | ⎬ 12 | 82 | 73 | Good foam |
| TMAEEA | 0.4 | 20 | 200 | 170 | " |
| " | | 21 | 198 | 172 | " |
| " | 0.6 | 17 | 140 | 127 | " |
| " | | 17 | 138 | 125 | " |
| " | 0.8 | 12 | 95 | 80 | " |
| " | | 12 | 96 | 80 | " |
| " | 1.0 | 10 | 83 | 73 | None to slight shrinkage |
| " | | 10 | 81 | 74 | |

(14) Hexadecyl dimethylamine (Baird Chemical Co.).

It appears from the results reported in Table 4 above that TMAEEA is more active than the control even when using 55% less catalyst. Also the TMAEEA catalyst permits wide latitude in concentration for processing polyester polyol foams.

EXAMPLE 6

The following formulation was employed in the preparation of a water-blown polyether polyurethane foam by the one-shot method.

| | | pbw |
|---|---|---|
| (15) | Voranol CP 3000 | 100.0 |
| | Silicone L-520 | 1.2 |
| | Water | 3.6 |
| (16) | T-9 | 0.25 |
| | Hylene TM 80/20 TDI (105 Index) | 45.5 |
| | Catalyst | Various |

(15) Propylene oxide adduct of glycerine (MW 3000; OH No. 56).
(16) Stannous octoate.

The results obtained are reported in Table 5 below compared with those using a typical catalyst employed in such formulations.

TABLE 5

| Catalyst | Conc. (PHP) | CT (sec) | RT (sec) | HGT (sec) |
|---|---|---|---|---|
| (17) DABCO 33LV | 0.25 | ⎫ 16 | 100 | 95 |
| | | ⎬ 17 | 101 | 93 |
| " | 0.30 | ⎫ 13 | 100 | 88 |
| | | ⎬ 13 | '98 | 88 |
| TMAEEA | 0.10 | ⎫ 20 | 104 | 85 |
| | | ⎬ 20 | 104 | 85 |
| " | 0.12 | ⎫ 17 | 104 | 85 |
| | | ⎬ 17 | 103 | 82 |

(17) 33% triethylene diamine in dipropylene glycol.

EXAMPLE 7

A number of isocyanurate foams were prepared using the following formulation:

| | | PBW |
|---|---|---|
| (18) | Voranol RS 350 | 20.0 |
| (19) | Silicone DC 193 | 1.5 |
| (20) | Genetron 11S ba | 15.0 |
| (21) | Mondur MR | 100.0 |
| | TMAEEA | Various |

(18) A sucrose propylene oxide based polyol having an equivalent weight of about 160 and MW of 700–900 (Dow Chemical).
(19) Silicone surfactant (Dow-Corning).
(20) Monofluorotrichloroethane (Allied Chemical Co.).
(21) 4,4'-methylene bis phenyl isocyanate of approx. 2.7 functionality and containing 31.5% NCO.

The properties of the foams obtained with different proportions of TMAEEA are reported in Table 6 below. Comparison of these with a sample of a commercial isocyanurate foam—code 25 (Upjohn)—is also reported in Table 6.

TABLE 6

| | Run No. 40 | 41 | 43 | 42 | |
|---|---|---|---|---|---|
| TMAEEA (pbw) | 1.5 | 2.0 | 2.5 | 3.0 | |
| C.T. (secs) | 27 | 23 | 15 | 12 | |
| Gel Time (secs) | 60 | 45 | 28 | 23 | |
| Tack Free (secs) | 180 | 150 | 112 | 100 | |
| R.T. (secs) | 210 | 195 | 132 | 123 | |
| | | | | | Commercial Code 25 |

TABLE I

| Catalyst | Structure | Wt. % Cat. | Induction Period; min. | Max. Exotherm °F (°C) | Yield % Isocyanurate |
|---|---|---|---|---|---|
| Trimethylamino ethyl ethanol amine | C\N—C—C—N—C—C—OH / C with C branch | 2 | Immed. | 240 (115.6) | 85+ |
| Pentamethyl-diethylene triamine | C\N—C—C—N—C—C—N/C / C with C branches | 2 | >45 | No reaction | — |
| Trimethylamino-ethyl isopropanol-amine | C\N—C—C—N—C—C/ with OH | 2 | >48 | No reaction | — |
| | | 3 | 13 | 150 (65.6) | 85+ |
| Dimethyl-ethanol amine | C\N—C—C—OH / C | 2 | >144 | No reaction | — |
| N,N,N',N'-tetra-methylamino-2-propanol | C\N—C—C—C—N/ with OH | 2 | >144 | No reaction | — |
| Hydroxyethyl tetramethyl diethylene-triamine | C—N—C—C—N—C / C—C—N C—COH / \ C C | 1 | Instant. | 240 (115.6) | 85+ |
| N,N bis hydroxy-ethyl dimethyl-ethylene-diamine | C—N—C—C—N—C / C—COH C—COH | 2 | 20 | 225 (107.2) | 85+ |

EXAMPLE 3

| | pbw | |
|---|---|---|
| (1) Niax Polyol 34-28 | 50.0 | ⎫ |
| (2) TPE-4542 | 30.0 | ⎬ Polyols |
| (3) XD - 1874 | 15.0 | |
| (4) Pluracol 355 | 5.0 | ⎭ |
| Water | 1.0 | |
| (5) T-12 | 0.03 – 0.05 | |
| Catalyst | Varied | |
| CaCO₃ No. 1 White | 60.0 | |
| (6) Freon 11B | 4.0 | |
| Carbon Black | 1.0 | |
| (7) PAPI 901 at 100 Index | 33.78 (isocyanate) | |

The above components were processed in conventional (one-shot) manner to produce a molded polyurethane semi-rigid foam of the type used in crash pads and instrument panels.

The various catalysts and quantities employed in the runs made using the foregoing formulation are recorded in Table 2 below, together with the time required for complete filling of the test mold, which was in the form of a maze with reversing paths from the point of introduction of the resin mixture.

TABLE 2

| Catalyst | Conc. pbw Amine | Tin | Time to Complete Filling of Mold Seconds |
|---|---|---|---|
| (8) NIAX A-1 | 0.1 | 0.05 | 85 |
| | 0.08 | 0.05 | 90 |
| TMAEEA | 0.08 | 0.03 | 110 |
| | 0.10 | 0.03 | 93 |
| | 0.12 | 0.03 | 90 |

(1) 20% acrylonitrile-styrene grafted onto a 5000MW polyol having 70% primary hydroxyl (OH No. 27.6), available from Union Carbide and Chemical Co.
(2) Liquid propylene oxide adduct of trimethylol propane terminating in ethylene oxide to form primary hydroxyl (OH No. 37; MW 4500) available from Wyandotte.
(3) REaction product of ethylene oxide and bisphenol A (Dow) (OH No. 212-229; MW 490-530).
(4) Liquid amine based polyol (OH No. 453) Wyandotte).
(5) Dibutyl tin dilaurate.
(6) Monoflurotrichlorethane (duPont).
(7) 4,4-methylene bisphenyl isocyanate of approx. 2 to 2.2 functionality containing 31.5% NCO (Upjohn).
(8) 70 parts bis (2-dimethyl amino-ethyl) ether in 30 parts dipropylene glycol.

EXAMPLE 4

The formulation below was employed for production of a highly resilient water-blown polyurethane foams, using different amine catalysts.

| | pbw | |
|---|---|---|
| (9) Niax 11-34 | 60 | ⎫ Polyols |
| (10) Niax 34-28 | 40 | ⎭ |
| Water | 2.8 | |
| (11) Silicone L-5305 Stabilizer | 1.5 | |
| T-12 | 0.03 | |
| TDI 80-20 (80%) | 34.2 | ⎫ |
| PAPI (20%) (Index at 100) | | ⎬ |
| Catalyst | Various | ⎭ |

TABLE 6-continued

| | Run No. 40 | 41 | 43 | 42 | |
|---|---|---|---|---|---|
| Density, PCF | 2.54 | 2.47 | 2.37 | 2.28 | 2.10 |
| Oxygen Index | 25 | 26 | 25 | 25 | 27 |
| TGA Loss at 300° C | 20.2 | 20.9 | 22.4 | 22.2 | 22.7 |
| % wt. retention at 300° C | 79.8 | 79.1 | 77.6 | 77.8 | 77.3 |
| Comp. strength RT (=° C) | 25 (−3.9) | 27.6 ('2.4) | 27.7 ('2.4) | 25.5 (−3.6) | 42.0 |
| PSI ½ at hr 350° F (Kg/cm² at 176.7° C) ½ hr. | 19.2 (1.35) | 18.4 (1.29) | 19.0 (1.34) | 17.4 (1.22) | 35 |
| % Comp. Strength Retention at 350° F, ½ hr. | 75 | 66 | 68 | 68 | 83 |
| % Friable 10 min. | 83.5 | 77.06 | 81.04 | 84.0 | |
| 20 min. | 100.0 | 93.7 | 95.4 | 94.0 | |

EXAMPLE 8

A series of runs were carried out to test the activity of various amine catalysts in several concentrations, in the preparation of polyisocyanurate foams by the conventional "one-shot" method. The standard formulation employed in each of these runs comprised:

| | | pbw |
|---|---|---|
| (22) | Mobay NB 2300580-1 | 44.0 |
| | Mondur MR | 100.0 |
| | Genetron 11S ba | 20.0 |
| | Catalyst | Various |

(22) Polyester-fatty acid reaction product for isocyanurate rigid foams (Mobay).

The results are reported in Table 7 below:

TABLE 7

| | Catalyst | PBW | Observations |
|---|---|---|---|
| (a) | TMAEEA | 1.0 | Good foams |
| | | 1.25 | " |
| | | 1.5 | " |
| (b) | N,N'bis hydroxy-ethyl dimethyl ethylene diamine | 1.25 | Good foams |
| | | 1.5 | " |
| (c) | Trimethyl-N-2 hydroxypropyl-ethylene diamine | 1.25 | Foams shrunk and collapsed |
| | | 1.5 | " |
| (d) | N-hydroxy-propyl imidazole | 1.25 | Foams shrunk and collapsed |
| | | 1.5 | " |
| (e) | Pentamethyl-diethylene-triamine | 1.25 | Severe shrinkage and collapse |
| | | 1.5 | " |
| (f) | N,N-dimethyl diglycolamine | 1.5 | Severe shrinkage and collapse |
| | | 2.0 | " |
| (g) | N-hydroxyethyl imidazole | 2.0 | Foam shrinkage |
| | | 2.5 | Foam shrinkage |
| | | 3.0 | Moderate shrinkage |
| (h) | N,N'tetramethyl-2-hydroxypropane-diamine | 1.0 | Severe shrinkage |
| | | 2.0 | " |
| | | 3.0 | " |
| (i) | Commercial Control Catalyst Polycat 41 | 1.25 | Good foams |
| | | 1.5 | " |

While both the monohydroxyethyl ethylene diamine compound (a) and the bis hydroxy ethyl ethylene diamine compound (b) gave good foams, these are not equivalent in activity as will be seen from the comparison of these in Table 8 below, employed in production of the polyisocyanurate in accordance with Example 7.

TABLE 8

| Amine Cat. | Conc. pbw | CT | GT | T.F.T. | R.T. |
|---|---|---|---|---|---|
| (a) | 1.25 | 13 | 18 | 55 | 68 |

TABLE 8-continued

| Amine Cat. | Conc. pbw | CT | GT | T.F.T. | R.T. |
|---|---|---|---|---|---|
| | 1.50 | 12 | 16 | 45 | 47 |
| (b) | 1.25 | 23 | 40 | 165 | 175 |
| | 1.50 | 23 | 45 | 150 | 180 |

It is also noted that the foams obtained with catalyst (b) while acceptable did not rise to desired height obtained with the TMAEEA (a) catalyst.

EXAMPLE 9

The utility of the novel catalysts of the invention in forming carbodiimides from isocyanates was shown by the following test.

In a flask connected to three successive saturated solutions of barium hydroxide there were charged 34.7 parts by weight of 2.4 toluene diisocyanate and 0.8 parts to 1.0 parts of TMAEEA. The mixture was agitated by shaking for a few minutes upon which a rapid exothermic reaction occurred generating a considerable amount of $CO_2$, evidenced by the barium carbonate precipitated in the connecting flasks. The foamed toluene diisocyanate polymer formed was examined by infrared spectroscopy and found to contain a substantial amount of carbodiimides groupings which showed up as bands at $2120 - 2140$ cm$^{-1}$.

While in the formulations of the foregoing examples TMAEEA is employed for the most part as the preferred catalyst according to the invention, it will be understood that other catalysts conforming to formula I may be similarly employed, particularly the compounds corresponding to formulae III and IV.

What is claimed is:

1. The method of promoting addition and polymerization reactions of organic isocyanates by basic catalysis which comprises: effecting such reactions in the presence of a catalytic amount of a hydroxyalkyl tertiary amine compound of the formula

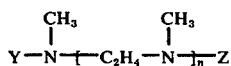

wherein Y is $CH_3$ or Z, Z is $-C_2H_4OH$, and $n$ is 1 or 2.

2. The method as defined in claim 1 wherein said tertiary amine compound corresponds to the formula

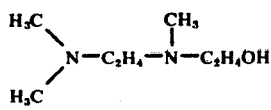

3. The method as defined in claim 1 wherein Y of the formula is $CH_3$.

4. The method of forming polyisocyanurates by polymerization of organic isocyanate compounds which comprises promoting such polymerization by the presence of a catalytic quantity of a hydroxyalkyl tertiary amine compound of the formula

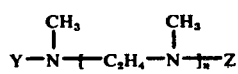

wherein Y is $CH_3$ or Z, Z is $-C_2H_4OH$, and $n$ is 1 or 2.

5. The method as defined in claim 4 wherein Y is $CH_3$.

6. The method as defined in claim 4 wherein said hydroxyalkyl tertiary amine compound is one corresponding to the formula

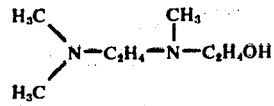

7. In the process for the production of polyurethane by the addition of a polyol compound containing reactive hydroxyl groups with an organic polyisocyanate, the method which comprises promoting the addition reaction by the presence of a catalytic quantity N,N,N'trimethylaminoethylethanolamine.

8. The method as defined in claim 7 wherein said polyol compound is a polyether polyol.

9. The method as defined in claim 7 wherein said polyol compound is a polyester polyol.

10. The method as defined in claim 7 wherein said addition is carried out in the presence of water to form a blown foam, resulting from carbon dioxide released from the polyisocyanate.

11. The method as defined in claim 7 wherein said addition is effected in the presence of a fluorocarbon blowing agent.

* * * * *